(12) United States Patent
Bauckman et al.

(10) Patent No.: US 8,590,088 B2
(45) Date of Patent: Nov. 26, 2013

(54) AUTOMATIC SWIMMING POOL CLEANERS AND ASSOCIATED HOSES

(75) Inventors: Mark J. Bauckman, Carlsbad, CA (US); Hendrikus Johannes Van Der Meijden, Midrand (ZA); Peter Hugh Harrison, Centurion (ZA)

(73) Assignee: Zodiac Pool Care Europe (FR)

( * ) Notice: Subject to any disclaimer, the term of this patent is extended or adjusted under 35 U.S.C. 154(b) by 1168 days.

(21) Appl. No.: 11/658,370

(22) PCT Filed: Aug. 29, 2005

(86) PCT No.: PCT/US2005/030675
§ 371 (c)(1),
(2), (4) Date: Sep. 4, 2008

(87) PCT Pub. No.: WO2006/026553
PCT Pub. Date: Mar. 9, 2006

(65) Prior Publication Data
US 2009/0007349 A1    Jan. 8, 2009

Related U.S. Application Data

(60) Provisional application No. 60/615,523, filed on Oct. 1, 2004, provisional application No. 60/645,883, filed on Jan. 21, 2005.

(30) Foreign Application Priority Data

Aug. 30, 2004    (ZA) .................................. 2004/6888

(51) Int. Cl.
*E04H 4/16* (2006.01)

(52) U.S. Cl.
USPC ............................................................ 15/1.7

(58) Field of Classification Search
USPC .......... 15/1.7; 285/7, 361, 396, 402; D23/266
See application file for complete search history.

(56) References Cited

U.S. PATENT DOCUMENTS

| 808,008 A | 12/1905 | Cagle |
| 919,743 A | 4/1909 | Mason |
| 1,538,007 A * | 5/1925 | Schellin ........................ 277/616 |
| 1,679,709 A | 8/1928 | George |
| 1,774,986 A | 9/1930 | Philip |
| 2,102,802 A | 12/1937 | Einar |

(Continued)

FOREIGN PATENT DOCUMENTS

| AU | 317552 | 1/2008 |
| DE | 4303596 | 8/1994 |

(Continued)

OTHER PUBLICATIONS

International Search Report and Written Opinion mailed Dec. 3, 2008 in International Application Serial No. PCT/US2008/074712.

(Continued)

*Primary Examiner* — Randall Chin
(74) *Attorney, Agent, or Firm* — Dean W. Russell; Kilpatrick Townsend & Stockton LLP (57) ABSTRACT

Automatic pool cleaners and associated hoses are detailed. Hoses may contract and expand in use and include sections of differing compliancies. Such contractions and expansions may be intensified in more compliant portions and attenuated in less compliant portions. Also discussed are positive locking mechanisms for adjacent hose sections.

24 Claims, 12 Drawing Sheets

(56) References Cited

U.S. PATENT DOCUMENTS

| | | | |
|---|---|---|---|
| 2,124,474 A | | 7/1938 | Scholtes |
| 2,143,960 A | | 1/1939 | Stalter et al. |
| 2,241,773 A | * | 5/1941 | Ernolf ................ 285/7 |
| 2,455,544 A | * | 12/1948 | Yonkers .............. 285/7 |
| 2,516,907 A | | 8/1950 | Penfold |
| 2,899,216 A | | 8/1959 | Brock |
| 3,676,986 A | * | 7/1972 | Reiling ............. 55/472 |
| 3,794,080 A | | 2/1974 | Huston et al. |
| 3,803,532 A | | 4/1974 | Taxon |
| 3,803,658 A | | 4/1974 | Raubenheimer |
| 3,955,594 A | | 5/1976 | Snow |
| 2,901,024 A | | 8/1979 | Marsden |
| 4,558,889 A | | 12/1985 | Gans |
| 4,675,921 A | * | 6/1987 | Jean-Jacques ......... 4/490 |
| 4,817,225 A | | 4/1989 | Stoltz |
| 5,046,764 A | | 9/1991 | Kimura et al. |
| 5,082,028 A | * | 1/1992 | Leonard ............ 138/118 |
| 5,195,563 A | | 3/1993 | Brooks |
| 5,315,728 A | * | 5/1994 | Atkins ............. 15/1.7 |
| 5,348,051 A | | 9/1994 | Kallenbach |
| 5,356,183 A | | 10/1994 | Cole |
| D356,858 S | | 3/1995 | Folkman |
| D365,625 S | | 12/1995 | Bova |
| 5,546,982 A | | 8/1996 | Clark et al. |
| 5,787,538 A | | 8/1998 | Moore et al. |
| 5,832,960 A | | 11/1998 | Amatsutsu et al. |
| 5,864,938 A | | 2/1999 | Gansel et al. |
| 5,897,083 A | | 4/1999 | Johnson et al. |
| 5,965,077 A | | 10/1999 | Rowley et al. |
| 6,170,882 B1 | | 1/2001 | Prest |
| 6,450,205 B1 | | 9/2002 | Check |
| 6,685,233 B2 | * | 2/2004 | Park et al. ......... 285/272 |
| 6,769,452 B2 | | 8/2004 | Qutub et al. |
| D561,303 S | | 2/2008 | Brockington et al. |
| D564,076 S | | 3/2008 | Brockington et al. |
| 7,399,000 B2 | | 7/2008 | Lee |
| D592,288 S | | 5/2009 | Price et al. |
| D593,186 S | | 5/2009 | van der Meijden et al. |
| 7,677,271 B2 | | 3/2010 | Boettner et al. |
| 7,786,381 B2 | * | 8/2010 | Henkin et al. ........ 174/68.1 |
| D628,288 S | | 11/2010 | Row et al. |
| D634,406 S | | 3/2011 | Klimas |
| 2004/0007278 A1 | | 1/2004 | Williams |
| 2004/0256016 A1 | | 12/2004 | Arima et al. |
| 2005/0155660 A1 | | 7/2005 | Handley |
| 2006/0011250 A1 | | 1/2006 | Ikemoto et al. |
| 2007/0144602 A1 | | 6/2007 | Henkin et al. |
| 2009/0025724 A1 | | 1/2009 | Herron |
| 2009/0077759 A1 | | 3/2009 | van et al. |
| 2010/0116272 A1 | | 5/2010 | Row et al. |
| 2010/0170589 A1 | | 7/2010 | Boettner et al. |

FOREIGN PATENT DOCUMENTS

| | | |
|---|---|---|
| EP | 0 701 083 | 3/1996 |
| FR | 2 604 351 | 4/1988 |
| GB | 1 259 256 | 1/1972 |
| JP | 2002209817 | 7/2002 |
| WO | WO 01/59236 | 8/2001 |
| WO | WO-2005015070 A1 | 2/2005 |
| WO | WO 2006/020835 | 2/2006 |
| WO | WO 2006/026553 | 3/2006 |
| WO | 2009042348 | 4/2009 |

OTHER PUBLICATIONS

Office Action dated Jul. 3, 2012 in U.S. Appl. No. 13/363,445.
International Search Report and Written Opinion dated Apr. 19, 2006 in Application No. PCT/US2005/030675.
Office Action dated Dec. 18, 2012 in connection with U.S. Appl. No. 13/363,445.
Preliminary Amendment and Supplemental Information Disclosure Statement dated Apr. 1, 2013 in connection with U.S. Appl. No. 13/363,445.
Office Action dated Apr. 9, 2013 in connection with U.S. Appl. No. 13/363,445.
Amendment, Response, and Supplemental Information Disclosure Statement dated Jul. 12, 2013 in connection with U.S. Appl. No. 13/363,445.
Notice of Allowance dated Jul. 29, 2013 in U.S. Appl. No. 13/363,445.

\* cited by examiner

FIG. 13

AUTOMATIC SWIMMING POOL CLEANERS AND ASSOCIATED HOSES

This application is the U.S. national phase of International Application No. PCT/US2005/030675 filed on Aug. 29, 2005 and published in English on Mar. 9, 2006 as International Publication No. WO 2006/026553, which application claims the benefit of South African Provisional application No. 2004/6888 entitled "Automatic Pool Cleaner" filed on Aug. 30, 2004 and claims the benefit of U.S. Provisional Application No. 60/615,523 entitled "Automatic Swimming Pool Cleaners and Associated Hoses" filed on Oct. 1, 2004 and claims the benefit of U.S. Provisional Patent Application No. 60/645,883 entitled "Automatic Swimming Pool Cleaners and Associated Hoses" filed on Jan. 21, 2005, the contents of which are incorporated herein by reference.

FIELD OF THE INVENTION

This INVENTION relates to automatic pool cleaners, more specifically to automatic pool cleaners of the suction kind, also referred to as the "pull" kind. It relates to a method of operating such a pool cleaner; to a hose and to a hose section for such a pool cleaner; and to an automatic pool cleaner of the suction kind.

BACKGROUND OF THE INVENTION

Although the Applicant does not wish to be bound by theory, it is believed that a brief, simplified explanation of the mechanism causing a pool cleaner head to move along a surface will assist a reader's understanding of the invention.

A suction kind, automatic pool cleaner includes a pool cleaner head having a suction pad interfacing with a substrate or surface to be cleaned, and a resilient hose interconnecting an inlet through the pad with a suction inlet of a pump for pumping pool water via a suction area at the interface of the pad and the surface to be cleaned, and via the hose to the pump. In the pool cleaner head, downstream of the suction pad inlet and upstream of the hose, there is provided a flow interruption mechanism for cyclically interrupting the flow, fully or partially. Water flowing along the hose has momentum due to mass and flow speed. Thus, when the flow is interrupted, an area of negative pressure is created in the hose and, because of the cyclic nature of the flow interruption, the negative pressure occurrences are presented as negative pressure pulses. At the occurrence of each negative pressure pulse, over pressure externally of the hose causes contraction and thus a shortening of the hose and thus a corresponding, jerking, displacement of the pool cleaner head. Simultaneously with the interruption of flow, suction between the suction pad and the surface being cleaned is temporarily interrupted, thus facilitating displacement. When flow is resumed, the negative pressure pulse is cancelled, pressures are equalized and the hose extends again, while auction between the pad and the surface is reinstated thus preventing or hindering the head from being displaced.

SUMMARY OF THE INVENTION

In, accordance with a first aspect of this invention, there is provided a method of operating an automatic pool cleaner of the suction kind including causing a hose of the pool cleaner cyclically to contract and to expand by cyclically, intermittently, interrupting flow of water through a pool cleaner head, the method including intensifying said contraction and expansion in an upstream, compliant portion of the hose adjacent the pool cleaner head and attenuating said contraction and expansion in a remaining, downstream, less compliant, portion (e.g. an element 24 of FIG. 1) of the hose downstream of said upstream compliant portion.

The Applicant believes that said intensifying contraction/expansion in said compliant portion of the hose (which can also be described as concentrating shortening/lengthening of the hose during negative pressure pulses proximate the head) enhances movement of the head. It is believed that such shortening of the hose, which causes jerking displacement of the head as explained above, when it takes place proximate the head, is more effective than a comparable shortening taking place more evenly over the length of the hose. The Applicant has observed both ends of the compliant portion being drawn together during negative pressure pulses and that a significant enhancement in movement of the head takes place, compared to a comparable installation but with a conventional hose. Movement enhancement is expected to be between about 10% and about 30%. In an initial test, axial movement of an upstream end of the compliant portion, acting against a constant load or mass showed an improvement of slightly more than 20% compared to a conventional hose.

Frequently, the hose is a composite hose provided by several, individually replaceable, sections. The method may thus include selecting a section incorporating said upstream, compliant portion from a plurality of sections having similar but non-identical compliant portions. The compliant portions may differ in respect of compliance or resilience. The section may be empirical by trying different compliant sections to find an appropriate one. The selection may be on the basis of selecting a compliant portion having a compliance to render a ratio of the compliances of said upstream compliant portion and said downstream less compliant portion an optimum.

In accordance with a second aspect of this invention, there is provided a method of operating an automatic pool cleaner of the suction kind, including reducing a frequency of flow interruptions in a head thereof, by rendering a portion of a hose thereof, proximate the head, more compliant than a remaining portion of the hose downstream of said portion proximate the hose.

The frequency may be reduced by between about 2% and about 15%. In an initial test, a reduction of about 5% was achieved compared to hoses not having such a more compliant portion.

In accordance with a third aspect of this invention, there is provided a method of operating an automatic pool cleaner of the suction kind, including reducing an intensity or amplitude of negative pressure pulses by rendering a hose of the pool cleaner more responsive in longitudinal contraction to negative pressure pulses by rendering a portion of a hose of the pool cleaner, proximate a head of the pool cleaner, longitudinally more compliant than a remaining portion of the hose.

The Applicant expects that this will increase an average flow rate of water through the head, by between about 2% and about 15%. In an initial test, an increase in average flow of about 5% was observed.

The method in accordance with any one of aspects one to three may include protecting said compliant portion of the hose against scuffing or abrasion in use, by means of radially outwardly projecting flanges proud of a general outer periphery. The flanges may be in the form of windings of a continuous helix or spiral along the length of said compliant portion.

In accordance with a fourth aspect there is provided a hose for an automatic pool cleaner of the suction kind, which hose has an upstream connector at an upstream end for connection to a pool cleaner head, and a downstream connector at a downstream end for connection to piping leading to a pump, the hose having, proximate the upstream connector, a compliant portion which is more compliant or less resilient than a remaining portion of the hose proximate the downstream connector.

When the hose is a composite hose comprising a plurality of hose sections, the compliant portion may be incorporated in a compliant hose section proximate the upstream connector. Conveniently, said compliant hose section may comprise said compliant portion and connectors fast with the compliant portion.

In accordance with a fifth aspect, there is provided a compliant hose section for a hose of an automatic pool cleaner of the suction kind, which compliant hose section includes a compliant portion providing at least a portion of the compliant hose, section, the compliant portion being compliant in longitudinal direction and in bending, the compliant portion comprising a generally longitudinally extending resilient element and a hose wall.

The compliant hose section may include the compliant portion and opposed connectors fast with the compliant portion for connecting the compliant section to other components of a pool cleaner. Advantageously, the wall of the hose section may incorporate said resilient element in the form of a spiral, the wall further including a sleeve of flexible material extending along the spiral.

The resilient element may be of metal. Instead, the resilient element may be of a synthetic polymeric material.

In one embodiment, the sleeve may be in the form of a moulding of synthetic polymeric material which is highly compliant, the sleeve including a helical formation providing an outward convex ridge formation and an opposing inward concave groove formation, the resilient element being seated under radial compression, internally, within the groove formation.

Advantageously, the sleeve may include a protecting outer formation for protecting it against scuffing or abrasion, the outer protecting formation standing proud of a general outer periphery of the compliant hose section. The outer formation may be in the form of outwardly projecting spiral or helical ribbing, Advantageously it may be integral with and an outward extension of said outward, convex ridge formation.

The compliant portion may have a length, when in relaxed condition, of between 0.1 and 0.5 meter (approx. 3.9-19.7"), preferably between 0.15 and 0.3 meter (approx. 5.9-11.8"), most preferably between 0.2 and 0.25 meter (approx. 7.9-9.8").

In accordance with a sixth aspect, there is provided an automatic pool cleaner of the suction kind which includes a pool cleaner head, and a generally resilient hose in accordance with the second aspect, for connecting the pool cleaner head to a suction end of a pump.

When the hose is a composite hose comprising a plurality of hose sections, one of them may be a hose section in accordance with the fifth aspect.

Further in accordance with the sixth aspect, there is provided an automatic pool cleaner of the suction kind comprising an automatic pool cleaner head;
a first hose section; and
a second hose section having a first end detachably connected to the automatic pool cleaner head and a second end detachably connected to the first hose section, the second hose section being (i) more compliant than the first hose section and (ii) more contractable than the first hose section when in use.

The second hose section (i) may have an inner diameter and may comprise a longitudinally extending resilient element having a diameter greater than the Inner diameter. The second hose section is a compliant hose section in accordance with this invention.

Additionally disclosed is a positive locking mechanism for two hose sections. Included as part of the mechanism are two protrusions spaced circumferentially about the exterior of a first hose section at or adjacent an end of the section. Also included are two curved channels spaced circumferentially about the exterior of a second hose section, commencing at an end of the section. Incorporated into each channel is a restriction narrowing its width.

In use, each protrusion of a first hose section is inserted into a corresponding channel of a second hose section. Rotating either hose section causes the protrusions to travel within the channels until they contact the restrictions. Thereafter, manual force may be applied to push the protrusions beyond the restrictions, temporarily separating slightly the boundaries of the channels to permit continued travel of the protrusions. As the protrusions push past the restrictions, the boundaries return to their original positions, trapping the protrusions within the channels and providing a positive latching of two hose sections.

Disconnecting the hose sections may proceed simply by rotating either hose section in the opposite direction. Again, manual force may be applied to push the protrusions back through the restrictions, allowing them to travel back through the remainder of the channels to the end of the second section. Once the protrusions reach the ends of the channels, the first and second hose sections will separate.

Detailed as well is an alternate locking mechanism for sections of hose. Unlike the previously-discussed mechanism, this alternate one requires no twisting of either section to effectuate locking. Instead, one section may simply be pushed onto the other, with clips extending from one section engaging recesses in the other section. (Thumb) tabs forming parts of the clips may be used to release them from the recesses if the hose sections must be separated.

Also optionally included in versions of this mechanism may be pliable material underlying the tabs and to which the tabs are directly or indirectly connected. Depressing the tabs deforms the pliable material, permitting the clips to disengage the recesses. When the tabs are not depressed, the pliable material typically will return to its normal (undeformed) state.

BRIEF DESCRIPTION OF THE DRAWINGS

The invention is now described by way of examples with reference to the accompanying diagrammatic drawings. In the drawings

DETAILED DESCRIPTION

Figure 1:
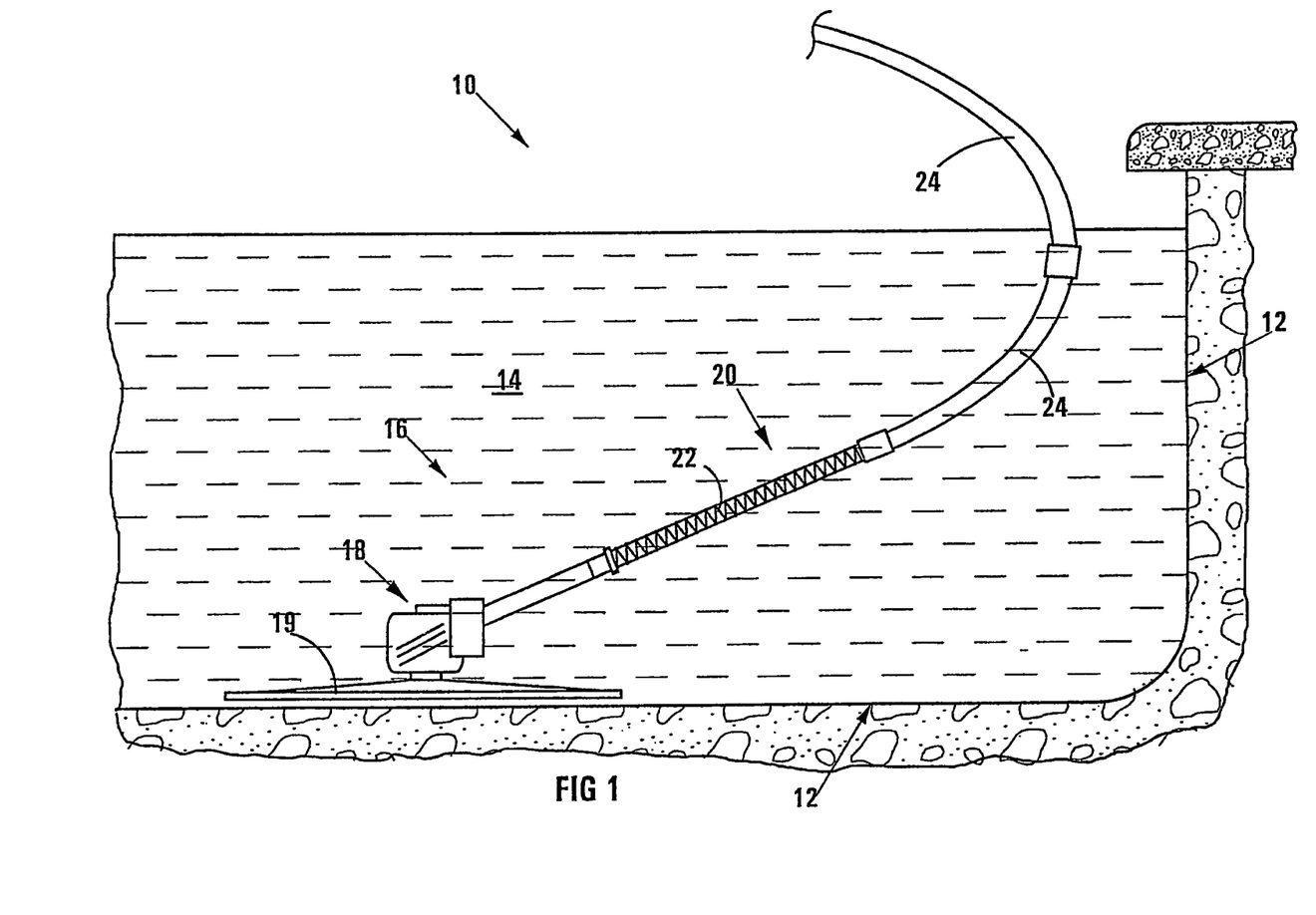
FIG. 1 shows, in section, a pool and a pod cleaner installation in accordance with the invention operating in the pool.

With reference to the drawings, more specifically to FIG. 1, a pool is indicated generally by reference numeral 10. It comprises a wall 12 bounding sides and a floor of the pool and containing a body 14 of water. A pool cleaner 16 is operative in the pool 10 to clean the wall 12.

The pool cleaner 16 is of the suction kind, comprising a pool cleaner head 18 having a suction pad 19 interfacing with the wall 12. A hose assembly 20 communicates an area immediately below the suction pad 19 with a pump, which is not shown, for pumping water via said interface between the suction pad 19 and the wall 12 via the pool cleaner head 18 and the hose assembly 20 to a filter arrangement.

Figure 2:
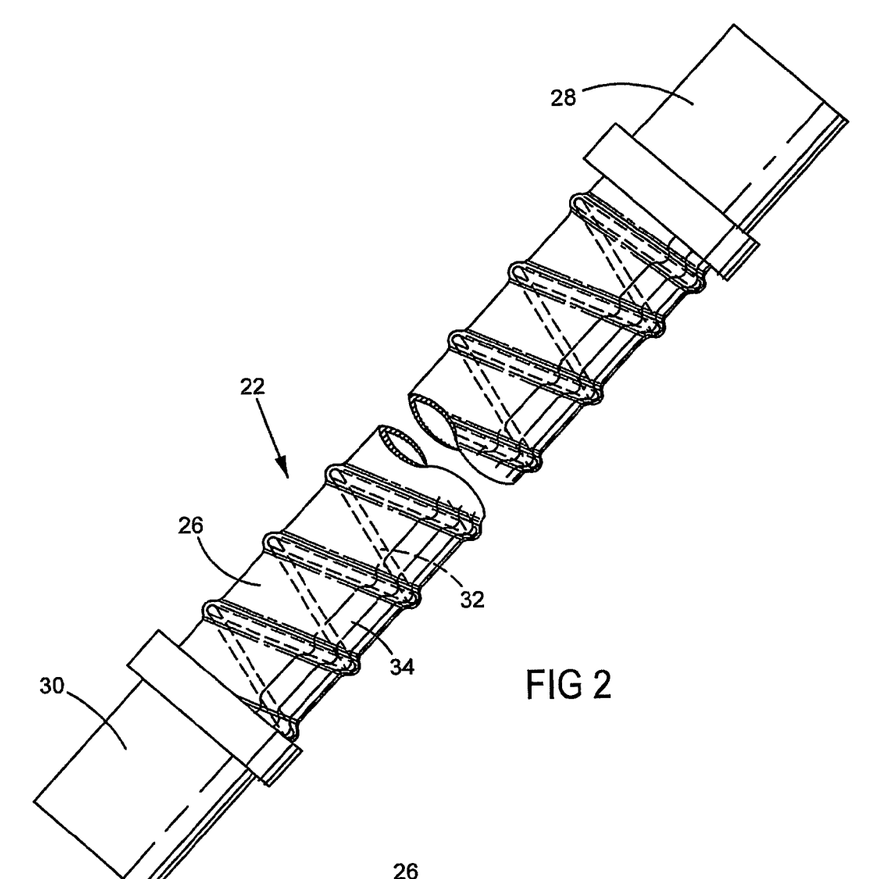
FIG. 2 shows, to a larger scale, fragmentarily, a first embodiment of a hose section forming part of the pool cleaner installation of FIG. 1.
Figure 3:
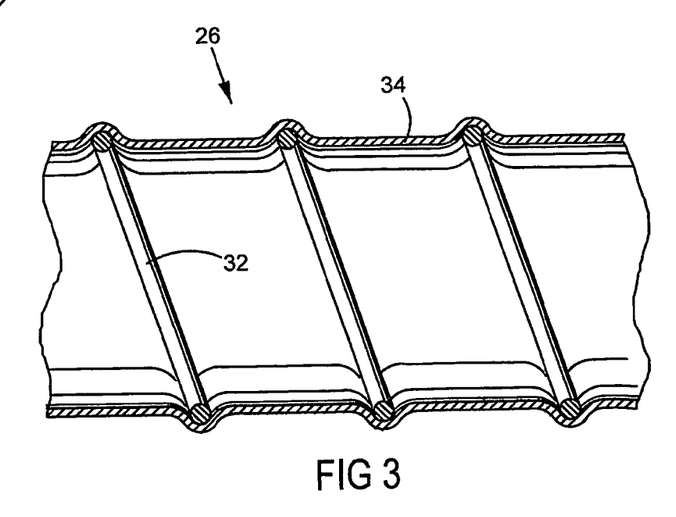
FIG. 3 shows, to yet a larger scale, fragmentarily, in section, the hose section of FIG. 2.

In accordance with the invention, and with reference more specifically also to FIGS. 2 and 3, the hose assembly 20 comprises a hose section 22, proximate the pool cleaner head 18, which has special characteristics in accordance with this invention.

The hose section 22 comprises a body or wall 26 and connectors 28 and 30 at opposite ends of the body 26, The body 26 is formed of a spiral element 32 and a sleeve of flexible synthetic polymeric material 34 extending along the spiral element 32.

The sleeve forms a conduit for conducting water. It is highly compliant, both longitudinally and in bending. The spiral element too is of low resilience longitudinally and in bending, yet is resistant to collapsing radially under external pressure to render the hose section resistant to radial collapsing during internal negative pressure pulses.

In one embodiment, the spiral element 32 is sandwiched between two layers forming the sleeve 34. The spiral element 32 is secured directly to the connectors 28, 30, and in other embodiments may be secured via the sleeve 34 to the connectors 28, 30. The spiral element 32 need not necessarily be sandwiched between two layers, however. Instead, other embodiments of the sleeve of the hose section 22 may employ only a single layer of polymeric material 34 or, regardless of the number of layers of material 34, may position the spiral element 32 so that it is not sandwiched between layers.

The spiral element 32 is of predetermined resilience, selected in respect of resilience characteristics of the material, the cross section (for example diameter) of the element, the diameter of the body or wall 26, the pitch of the loops of the spiral element 32 and the like. The spiral element 32 may be of metal or metal alloy which is resistant, or which has been treated to be resistant, to corrosion in pool water, especially bearing in mind the sometimes hostile characteristics of pool water. In other embodiments, the spiral element 32 may be of synthetic polymeric material. It is preferred that the spiral element 32 is of a relatively lightweight metal or metal alloy.

The resilience of the spiral element 32 imparts resilience in longitudinal direction to the hose section 22 such that the hose section 22, when in operation as part of the pool cleaner 16, contracts during negative pressure pulses to a contracted length of between about one fifth and about one half, advantageously between about one quarter and about two fifths, preferably to about one third of its length when relaxed. It is to be appreciated that operating characteristics for pool cleaners differ, and that operating characteristics for identical pool cleaners in differing pool cleaning installations also differ. Thus, it is envisaged that routine empiric experimentation will be conducted to produce, for a specific pool cleaner, a range of such hose sections covering a variety of operating conditions brought about by a corresponding variety of possible pool cleaner installations. When commissioning a pool cleaner installation, empiric selection of an appropriate hose section to suite the specific installation will be conducted. Selection may be from a plurality of similar hose sections which are non-identical, incorporating progressive changes in resilience.

It is a further object of the invention to provide the hose section 22 such that it has a very small resistance against bending, thus facilitating bending of the hose assembly in the region of the hose section 22 thus to facilitate deviations from a straight line of the pool cleaner head, for example when it has to negotiate bends, corners, and the like. This is achieved in embodiments as disclosed by having the sleeve of a highly compliant material and construction and by rendering the compliant portion or section resistant to radial collapse during negative pressure pulses internally of the portion or section by means of the resilience spiral element, yet by not unduly increasing the resilience in longitudinal direction or in bending due to the presence of the resilient spiral element. By nature of its construction, the resilient spiral element has low resilience (i.e. high compliance) longitudinally and in bending, yet is highly resistant against radial collapse or crushing.

Yet a further advantage which the Applicant believes is achieved in accordance with this invention, is that the low resistance to bending of the hose section 22 proximate the pool cleaner head 18 will lessen the tendency of the pool cleaner head 18 to follow the specific arrangement at any time of the hose assembly 20, and thus to render the pool cleaner head 18 more responsive to external factors other than that caused by the hose assembly 20 to deviate from a straight line.

As disclosed above, by intensifying or concentrating contraction/expansion of the hose by means of the compliant portion proximate the head, the movement of the head is significantly enhanced or increased.

Figure 4:
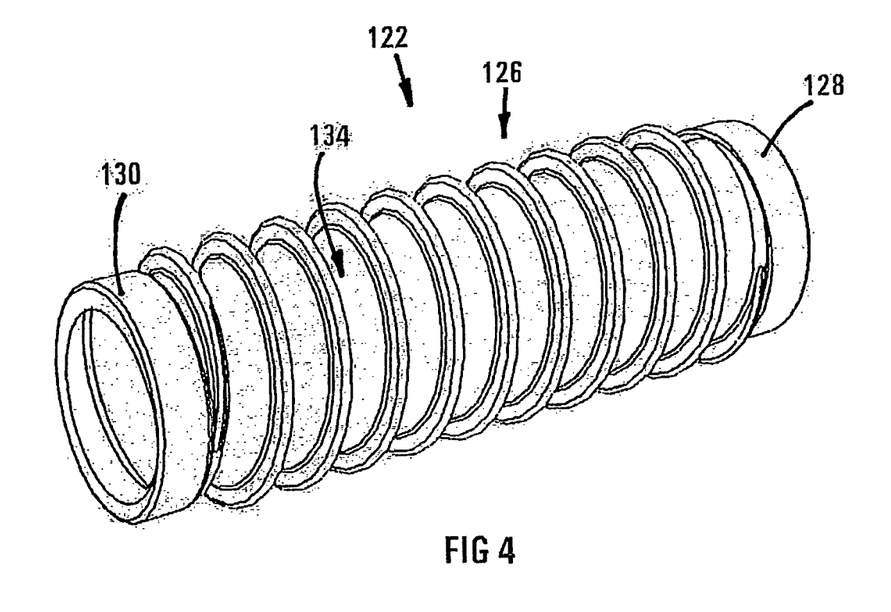
FIGS. 4 to 6 show, in respect of a second embodiment, respectively a three dimensional side view, an axial section, and a three dimensional view in section.
Figure 5:
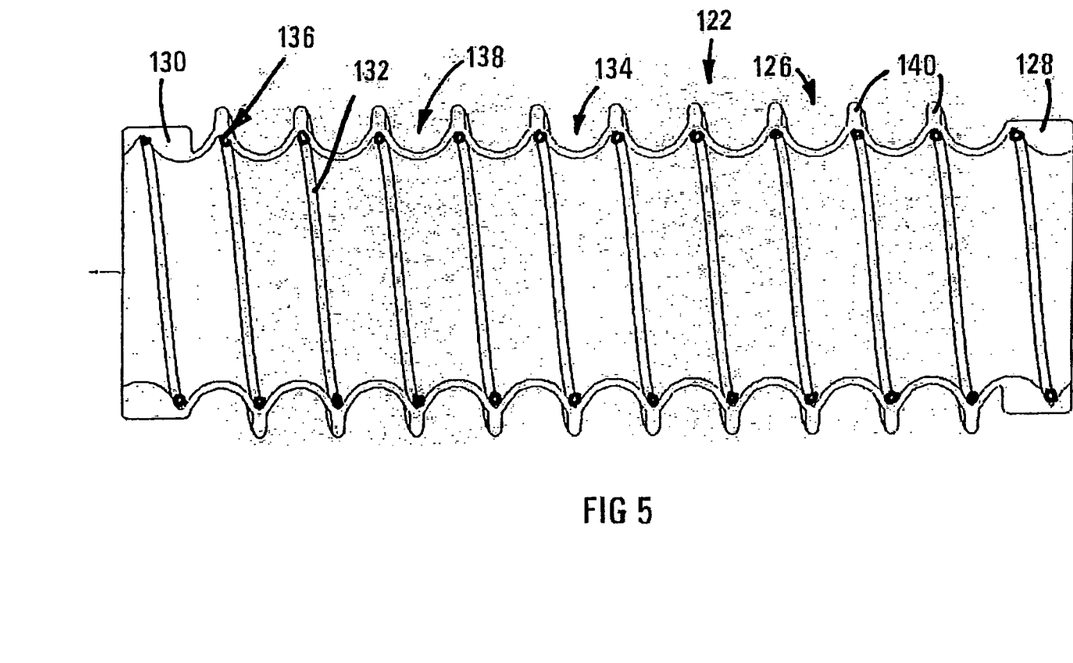
Figure 6:
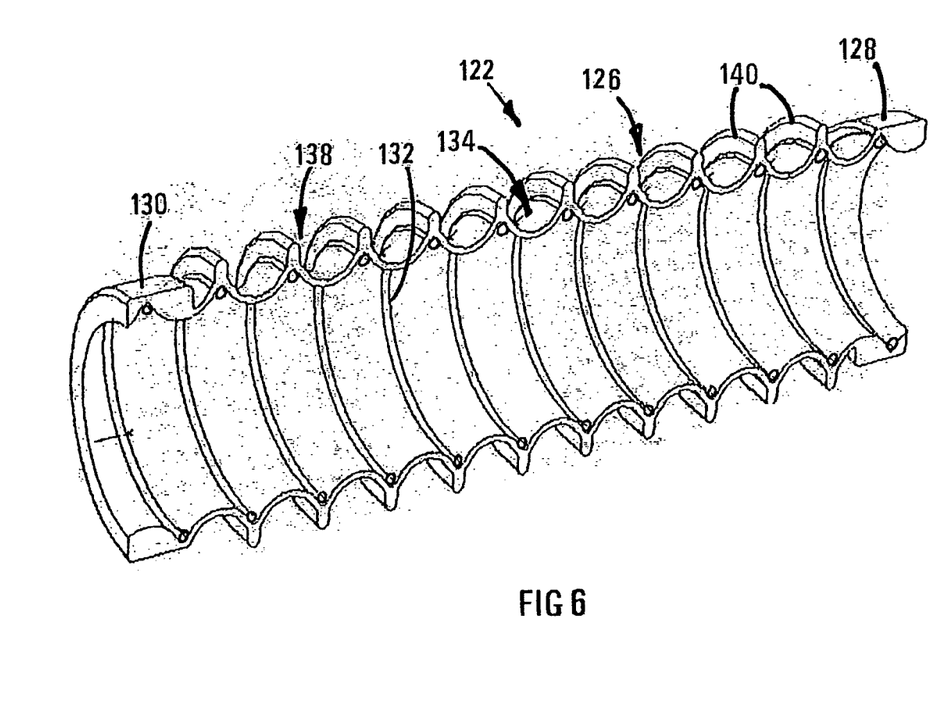

With reference to FIGS. 4, 5 and 6 a further embodiment of a hose section in accordance with the invention is generally indicated by reference numeral 122. The hose section 122 is very compliant such that, in comparison to a conventional hose, it has a higher compliance.

The hose section 122 is in many respects similar to the hose section 22 of FIGS. 1 to 3, and it generally has the same advantages. Thus, it is not again described in detail, but reference will be made merely to differences. Also, like reference numerals are used to, indicate like components or features.

The hose section 122 includes a hose body 126 and connectors 128, 130 at ends thereof to allow connection of the hose section 122 into a hose for a pool cleaner of the suction kind. The hose section 122 includes a sleeve 134 and a resilient element 132.

The sleeve 134 is in the form of a moulding od synthetic polymeric material having high compliance. It is in the form of a spiral or helix having, intermittently, a radially outer, convex ridge formation 136 and an outer concave valley formation extending between adjacent loops of the ridge formation and indicated by reference numeral 138 . Internally, the convex ridge formation is presented as inner, concave seat formation within which the spiral resilient element 132 is seated.

The sleeve 134 and the resilient element 132 are manufactured separately. During assembly, a trailing end of the resilient element 132 is held fast while a leading end is rotationally strained in the direction of the helix and is screwingly pulled through the passage along the sleeve 134. Such straining of the resilient element decreases its diameter, thus allowing it easily to be led into position within the sleeve 134. When it is released, the natural resilience of the resilient element distends it to abut the sleeve 134 internally, and by appropriate manipulation, the windings or loops of the spiral element 132 are seated within the inner, concave seat formation 136. It is to be appreciated that a relaxed diameter of the resilient element 132 is at least slightly more than a nominal diameter of the seat formation 136 such that the resilient element 132 is under compression when in position within the sleeve 134.

It is to be appreciated that the diameter of the resilient element 132 is larger than the inner periphery of the sleeve 134 as presented by the outwardly concave, inwardly convex valley formation 138 spanning between adjacent ridge windings.

By way of development, integrally moulded with the ridge formations 136, an outer spiral rib formation 140 is integral therewith to protect the sleeve 134 against abrasion, scuffing and the like.

In addition to the advantages mentioned above, the Applicant has found that the frequency of flow interruptions in the pool cleaner head is reduced, while the flow of water through the head increases, indicating an increased efficiency. Furthermore, the intensity or level of the negative pressure pulses is reduced which, together with the reduced frequency of interruptions, is conducive to longevity and durability.

Illustrated in FIGS. 7-10 are portions of respective first and second hose sections 204 and 208. Sections 204 and 208 may form part of hose assembly 20 of the invention and preferably (although not necessarily) connect ultimately to a suction-kind pool cleaner 16. Additionally, sections 204 and 208 may be formed similar to either of hose sections 22 or 122 if desired. However, sections 204 and 208 need not be so formed, and indeed may be conventional in many respects.

Figure 7:
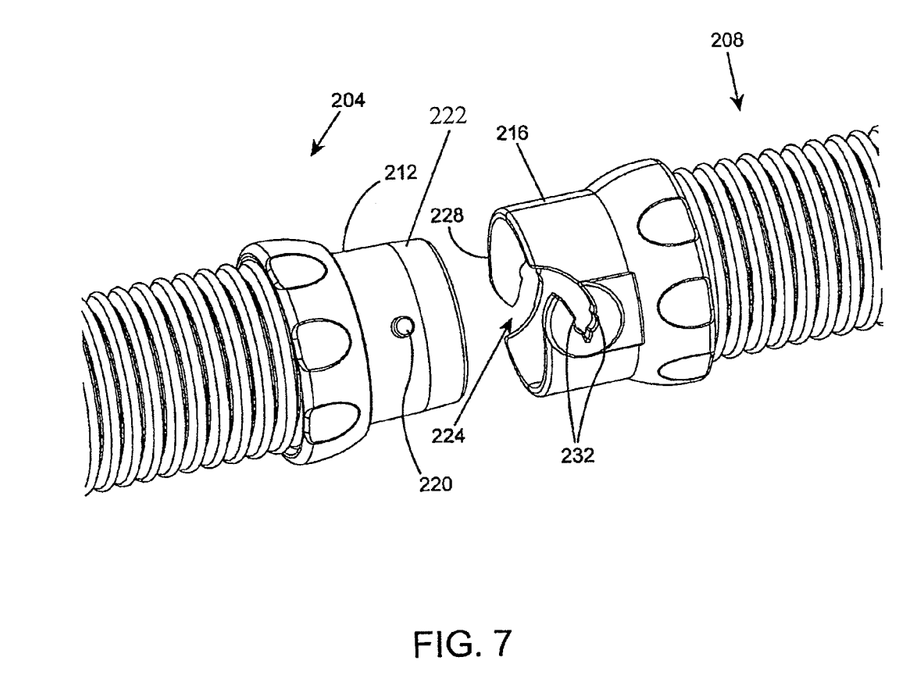
FIGS. 7-10 illustrate an exemplary locking mechanism for two hose sections, with the figures collectively displaying a sequence of positions of protrusions of the mechanism within corresponding channels.
Figure 8:
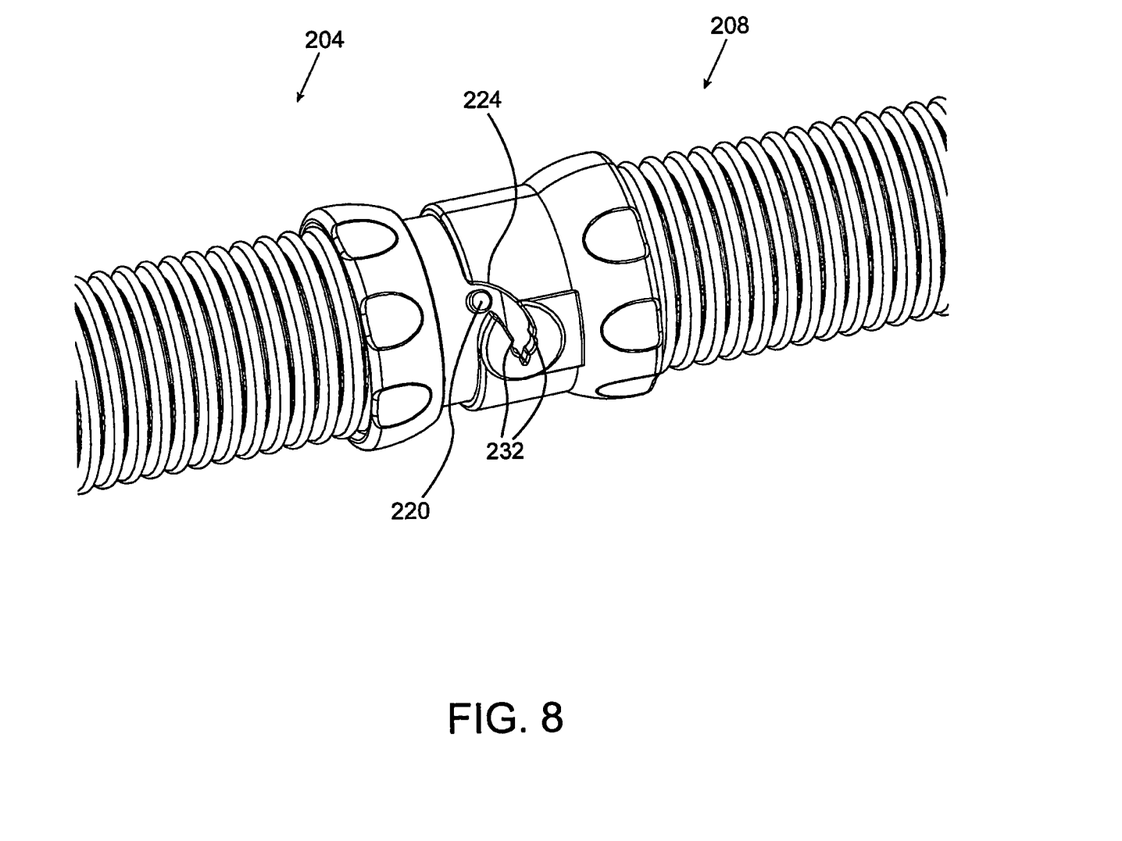
Figure 9:
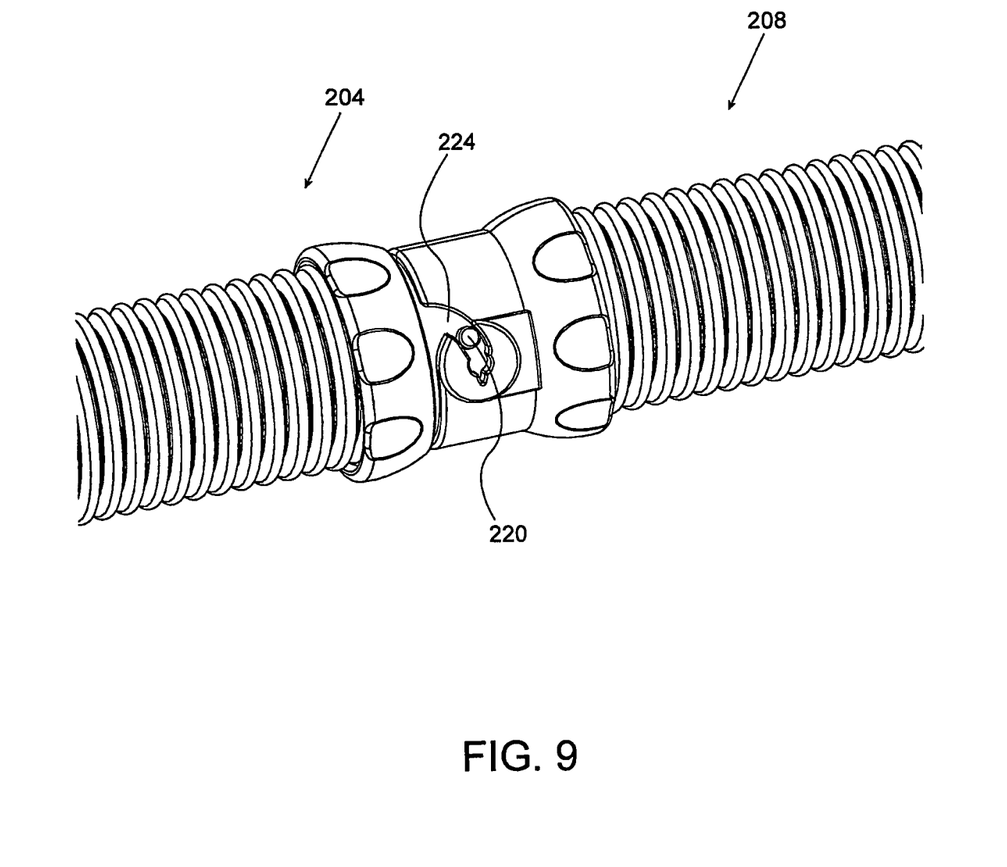
Figure 10:
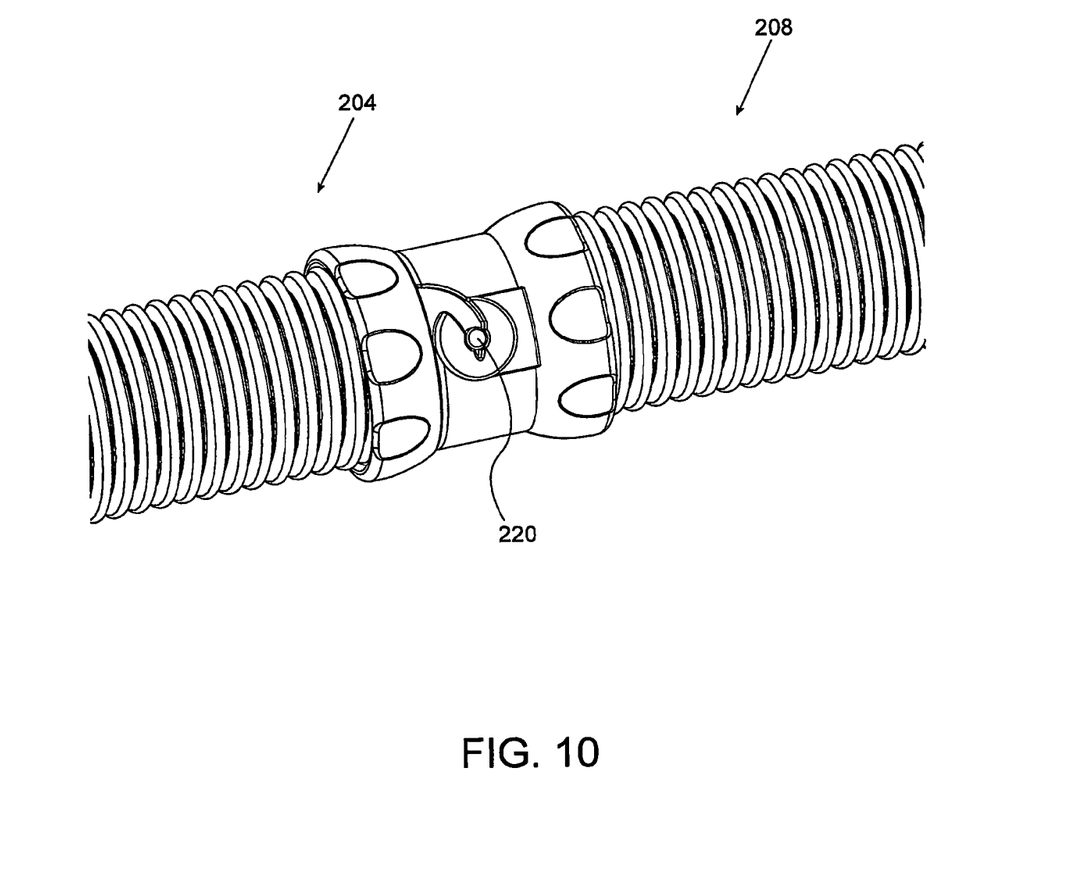

Detailed especially in FIG. 7 are ends 212 and 216 of respective sections 204 and 208. End 212, nominally designated a "male" connector or cuff, is designed to be fitted into the nominally "female" cuff of end 216. Typically, each section 204 and 208 will have both a male cuff and a female cuff, with the male cuff located at one end of the section and the female cuff located at the other end of the section. Sections 204 and 208 need not necessarily be configured in this manner, however.

End 212 preferably has a portion that is cylindrical in shape, with one or more protrusions 220 extending from its exterior surface 222. In at least one embodiment of section 204, two protrusions 220 are spaced one hundred eighty degrees along the circumference of end 212. Protrusions 220 advantageously may have circular cross-section, although other shapes may be employed instead.

End 216 likewise has a portion that is cylindrical in shape, with diameter slightly larger than that of the cylindrical portion of end 212. End 216 thus may receive end 212 as part of the connection process. End 216 also includes one or more channels 224, with the number of channels 224 beneficially equaling the number of protrusions 220 so as to provide a one-to-one correspondence therebetween. Such correspondence need not necessarily exist, however, although typically the number of protrusions 220 would not exceed the number of channels 224.

As shown in FIGS. 7-10, each channel 224 commences at edge 228 of end 216 and preferably is curved: Channels 224 have maximum width slightly greater than the diameter of the cross-section of protrusions 220 so as to allow protrusions to travel within them. Channels 224 also each include one or more restrictions 232, which decrease the width to a value slightly less than the diameter of the cross-section of protrusions 220.

By curving channels 224, fitting of end 212 into end 216 and rotation of protrusions 220 within the channels 224 may occur simultaneously. In essence, once protrusions 220 are aligned with entrances to channels 224 (see FIG. 8), fitting end 212 into end 216 will cause the protrusions 220 to enter the channels 224. Boundaries of channels 224 will guide travel of protrusions 220 (see FIG. 9), resulting in one of sections 204 and 208 rotating relative to the other until protrusions 220 contact restrictions 232.

Because restrictions 232 decrease the width of channels 224 to less than the diameter of protrusions 220, the protrusions 220 cannot naturally travel beyond the restrictions 232 within the channels 224. However, section 208 may be formed of plastics or other material with some resiliency, so that manual or other force may be employed to compel slight separation of restrictions 232 to allow protrusions 220 to pass thereby. When the force no longer is applied, restrictions 232 will rebound to their normal positions, trapping protrusions 220 within channels 224 (see FIG. 10).

Protrusions 220 and channels 224 thus provide a positive locking system for, principally, hoses used in connection with suction-kind automatic swimming pool cleaners. The locking system requires no additional parts, as existing male and female cuffs themselves positively connect together. When no suction pressure is applied to the hose, sections 204 and 208 nevertheless may remain interlocked, reducing the likelihood of their separating when handled by consumers. Moreover, if the swimming pool cleaner head, for example, is configured with either protrusions 220 or channels 224, a terminal hose section of the invention may connect, and positively lock, to the head too.

Figure 11:
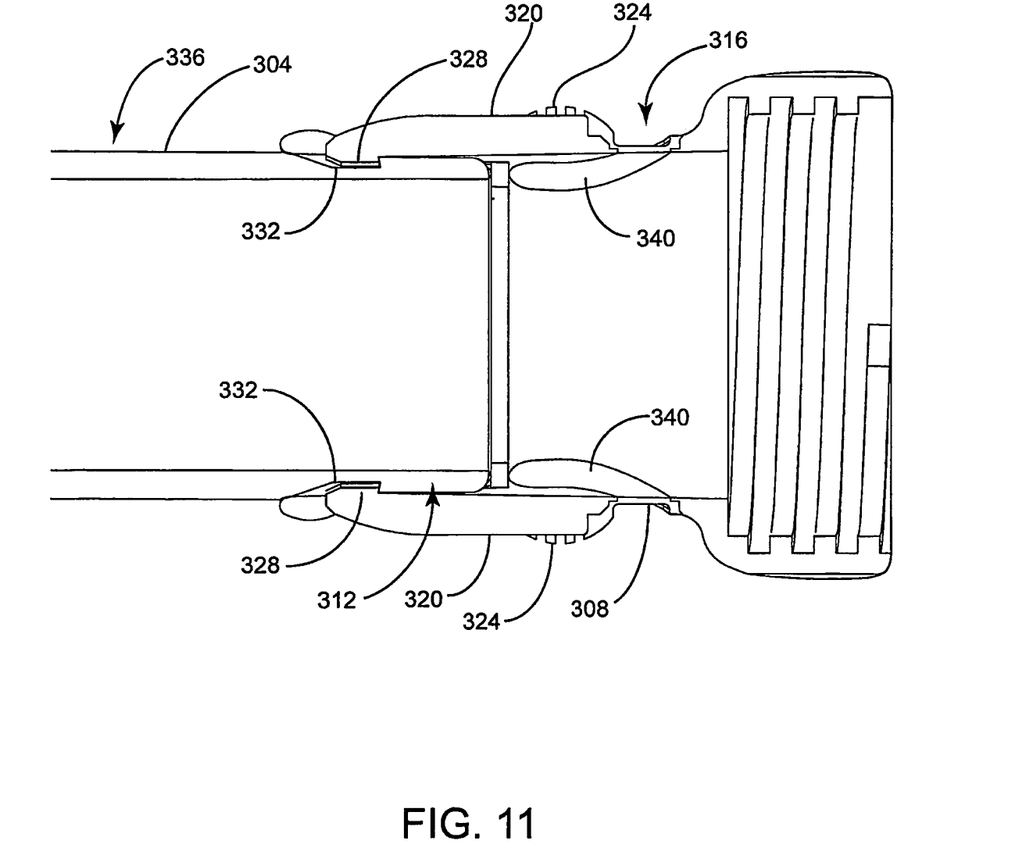
FIGS. 11-13 detail an alternate exemplary locking mechanism for two hose sections, with FIG. 11 providing a cross-sectional view of portions of coupled hose sections.
Figure 12:
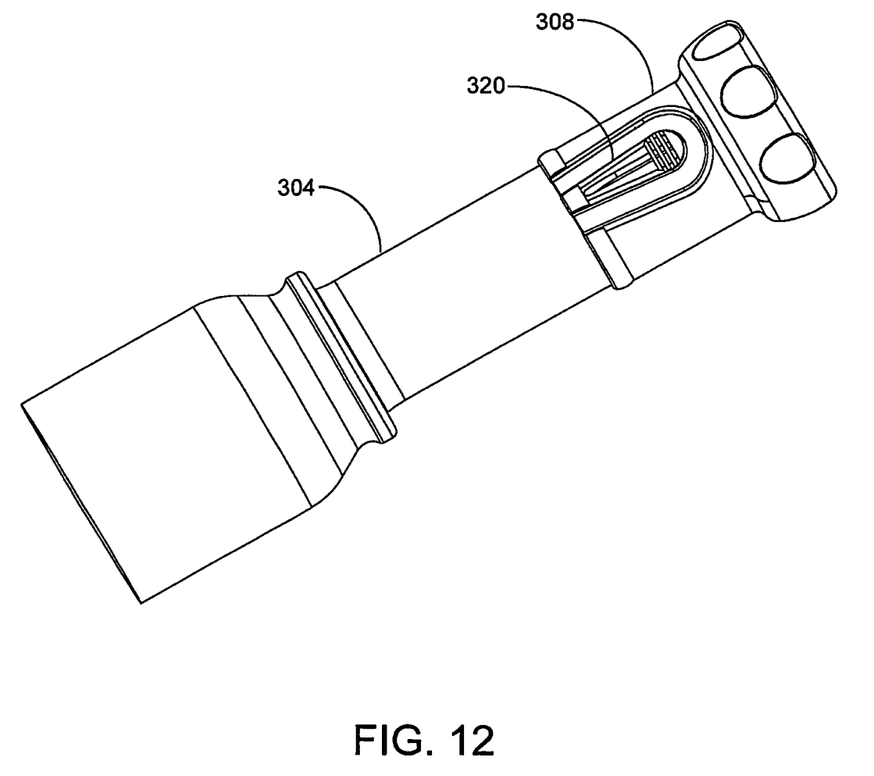
Figure 13:
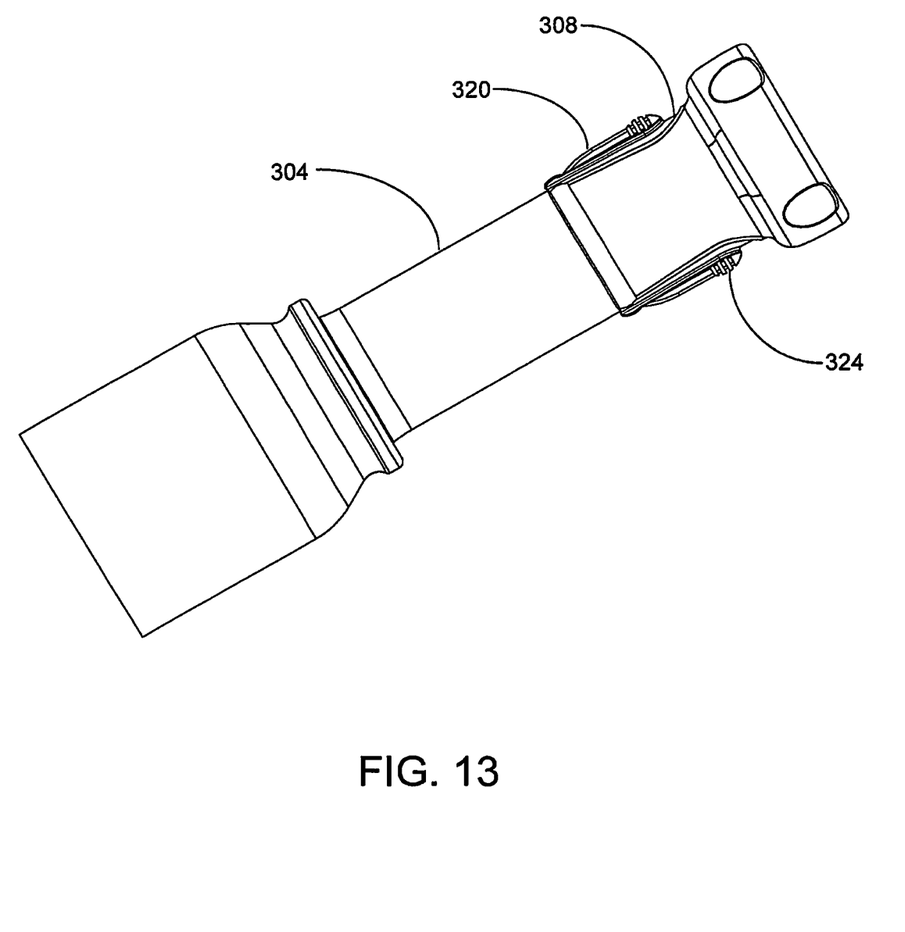

Depicted in FIGS. 11-13 are portions of respective first and second hose sections 304 and 308. Sections 304 and 308, like sections 204 and 208, may form part of hose assembly 20 of the invention. They too preferably, but not necessarily, connect ultimately to a suction-kind pool cleaner 16. Likewise, sections 204 and 208 may be formed similar to either of hose sections 22 or 122, although such forming is not necessary.

FIG. 11 illustrates coupling of sections 304 and 308. Shown in FIG. 11 is end 312 of section 304, which in use may abut (or be fitted into or have fitted into it) end 316 of section 308. Many sections 304 and 308 will include both an end configured like end 312 and, opposite that end, an end configured like end 316. Any section 304 or 308 need not necessarily be created in this manner, however.

Each of ends 312 and 316 preferably has a cylindrical portion. Extending beyond this portion of end 316 may be one or more clips 320. Clips 320 typically are elongated, with each comprising a (thumb) tab 324 at one end and a protrusion 328 at the other.

Incorporated into end 312 are one or more recesses 332. Recesses 332 are adapted in use to receive protrusions 328, locking an end 312 to an end 316. In some embodiments of sections 304 and 308, clips 320 may be made generally immobile, so that protrusions 328 remain in recesses 332 by a friction fit.

Preferably, however, portions of clips 320 containing protrusions 328 are movable toward and away from exterior surface 336 of section 304. Moving these portions away from exterior surface 336 disengages protrusions 328 from recesses 332. By contrast, moving protrusions 328 toward exterior surface 336 permits the protrusions 328 to engage recesses 332.

Movement of a clip 320 may be effected using its tab 324. Underlying tab 324 beneficially may be pliable material 340 able to compress, or at least deform, when subjected to external forces. Thus, depressing tab 324 causes it to travel into the area initially filled by material 340, forcing the remainder of clip 320 (including the portion containing protrusion 328) to move away from exterior surface 336. Because material 340 tends to return to its initial position when not subjected to these forces, releasing tab 324 causes clip 320 to travel to the position shown in FIGS. 11-13, in which protrusions have seated in recesses 328.

Shown in FIG. 11 are two clips 320 and two corresponding recesses 328, each clip 320 spaced one hundred eighty degrees from the other about the circumference of its corresponding section 308, and each recess 328 spaced similarly about the circumference of its associated section 304. More or fewer clips 320 and recesses 328 may be provided if necessary or desired, and the number of clips 320 and recesses 328 on coupled sections need not always correspond. Nevertheless, preferably at least two clips 320 and recesses 328 are included on any section 304 or 308 containing such clips and recesses, with each clip 320 engaging a single recess 328.

The foregoing is provided for purposes of illustrating, explaining, and describing exemplary embodiments and certain benefits of the present invention. Modifications and adaptations to the illustrated and described embodiments will be apparent to those skilled in the relevant art and may be made without departing from the scope or spirit of the invention.

What is claimed is:

1. In a pool-cleaning system containing water, a suction-hose assembly for use in water of a pool, the assembly comprising:
    a first pool suction-hose section;
    a second pool suction-hose section; and
    circumferentially-discontinuous means for interlocking the first and second pool suction-hose sections.

2. The system according to claim 1 in which at least one of the first and second pool suction-hose sections comprises means for connection to a suction-type automatic swimming pool cleaner.

3. The system according to claim 1 in which each of the first and second pool suction-hose sections has first and second ends, the first end of the first pool suction-hose section having a surface and a circumferentially-discontinuous protrusion extending therefrom and the second end of each of the first and second pool suction-hose sections defining a circumferentially-discontinuous channel, the protrusion of the first pool suction-hose section in use being received by and traveling within the channel of the second pool suction-hose section so as to interlock the first and second pool suction-hose sections.

4. The system according to claim 3 in which the channel of the second pool suction-hose section is curved.

5. The system according to claim 4 in which the second end of the second pool suction-hose section has an edge and the channel has an entrance at the edge.

6. The system according to claim 3 in which each of the first and second ends of each of the first and second pool suction-hose sections has a cylindrical portion, the cylindrical portion of the first end of the first pool suction-hose section being fitted into the cylindrical portion of the second end of the second pool suction-hose section in use.

7. The system according to claim 4 in which the first end of the second pool suction-hose section has a surface and a protrusion extending therefrom.

8. The system according to claim 7 in which the surface of the first end of the second pool suction-hose section is an exterior surface.

9. The system according to claim 1 in which the first pool suction-hose section has an end and at least one clip and the second pool suction-hose section has at least one recess engaged by the at least one clip.

10. The system according to claim 9 in which the first pool suction-hose section has a plurality of clips extending beyond the end and the second pool suction-hose section has a plurality of recesses, each recess engaged by a clip.

11. The system according to claim 9 in which the at least one clip comprises a depressible tab.

12. The system according to claim 11 in which the first pool suction-hose section comprises pliable material underlying the tab.

13. The system according to claim 9 in which the clip extends beyond the end of the first pool suction-hose section.

14. A suction-hose assembly for use in a pool, the assembly comprising:
    a first suction-hose section having first and second ends, the first end of the first suction-hose section having a surface and a protrusion extending therefrom;
    a second suction-hose section having first and second ends, the second end of the second suction-hose section defining a channel, the protrusion of the first suction-hose section in use being received by and traveling within the channel of the second suction-hose section so as to interlock the first and second-hose sections; and
    a restriction in the channel of the second suction-hose section, which restriction retains the protrusion of the first suction-hose section.

15. A suction-hose assembly for use in a pool, the assembly comprising:
    a first suction-hose section having first and second ends, the first end of the first suction-hose section having a surface and a protrusion extending therefrom;
    a second suction-hose section having first and second ends, the second end of the second suction-hose section defining a curved channel, the protrusion of the first suction-hose section in use being received by and traveling within the channel of the second suction-hose section so as to interlock the first and second-hose sections; and
    in which the protrusion of the first suction-hose section has circular cross-section and the channel of the second suction-hose section has a maximum width slightly greater than the diameter of the circular cross-section.

16. A suction-hose assembly according to claim 15 in which the channel of the second suction-hose section has a restriction therein, the restriction decreasing the width of the channel to a value slightly less than the diameter of the circular cross-section of the protrusion of the first suction-hose section.

17. An automatic, suction-side swimming pool cleaner assembly comprising:
    a head adapted to receive debris-laden water from a swimming pool; and
    first, second, and third hose sections through which the debris-laden water passes, the first hose section connected to the head, the second hose section connected to the first hose section, and the third hose section connected to the second hose section, at least one of the first or third hose sections having a first channel having a restriction therein, the second hose section comprising first and second ends, the first end having a surface and a protrusion extending therefrom and the second end defining a second channel having a restriction therein, the protrusion in use being received by and traveling within the first channel and the restriction of the first channel retaining the protrusion within the first channel.

18. A pool-cleaning system comprising:
    an automatic pool cleaner;

a first hose section; and a second hose section having a first end detachably connected to the automatic pool cleaner and a second end detachably connected to the first hose section, the second hose section (A) being (i) more compliant than the first hose section and (ii) more contractable than the first hose section when in use, (B) having an inner diameter, and (C) comprising a longitudinally extending resilient element having a diameter greater than the inner diameter.

19. In a pool-cleaning system containing water:

a suction-type automatic pool cleaner for use in water of a pool;

a first suction-hose section for use in water of the pool; and circumferentially-discontinuous means for interlocking the first suction-hose section and the suction-type automatic pool cleaner.

20. The system according to claim 19 further comprising a second suction-hose section and means for interlocking the first and second suction-hose sections.

21. The system according to claim 20 in which at least one of the first and second suction-hose sections is flexible.

22. The system according to claim 19 in which the first suction-hose section is flexible.

23. The system according to claim 19 in which the first suction-hose section is tubular.

24. In a pool-cleaning system containing water:

a suction-type automatic pool cleaner for use in water of a pool and having a head;

a flexible first suction-hose section for use in water of the pool and having opposite first and second ends, at least one of the ends defining a circumferentially-discontinuous channel, the first end proximate the head in use;

a flexible second suction-hose section proximate the second end of the first suction-hose section in use; and means for connecting the first suction-hose section between the head and the second suction-hose section, the connecting means comprising at least one circumferentially-discontinuous protrusion configured in use to be received by and to travel within the channel.

\* \* \* \* \*